May 6, 1930.                    G. KUTZNER                    1,757,639
                         SLIDING WINDOW FOR VEHICLES
                           Filed July 3, 1928        2 Sheets-Sheet 1
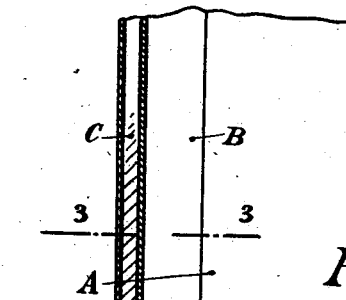
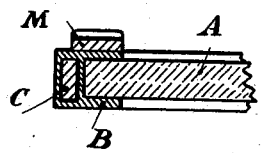
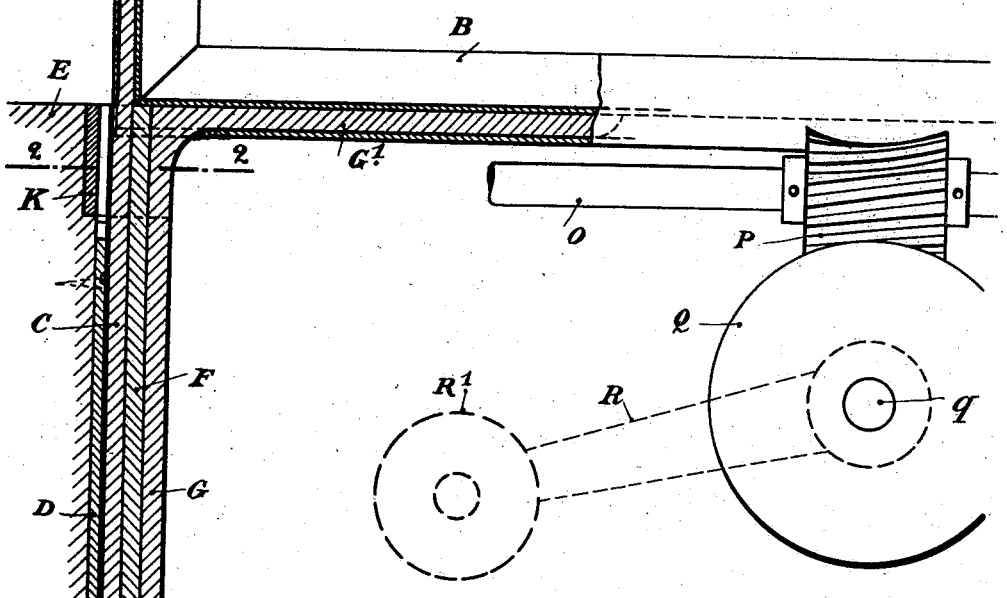
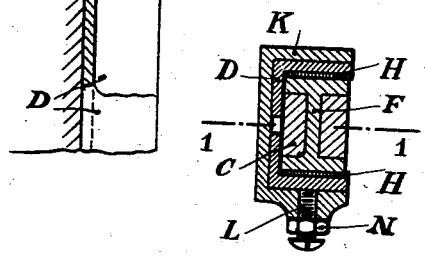
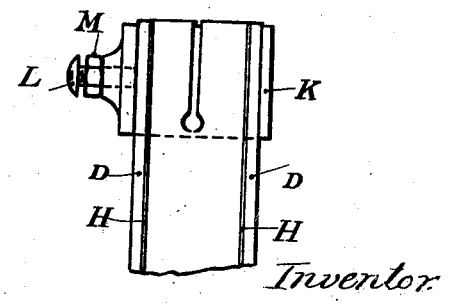
Inventor
Gustave Kutzner
by Connally Bros
       Attys May 6, 1930.                G. KUTZNER                1,757,639
                      SLIDING WINDOW FOR VEHICLES
                        Filed July 3, 1928          2 Sheets-Sheet 2
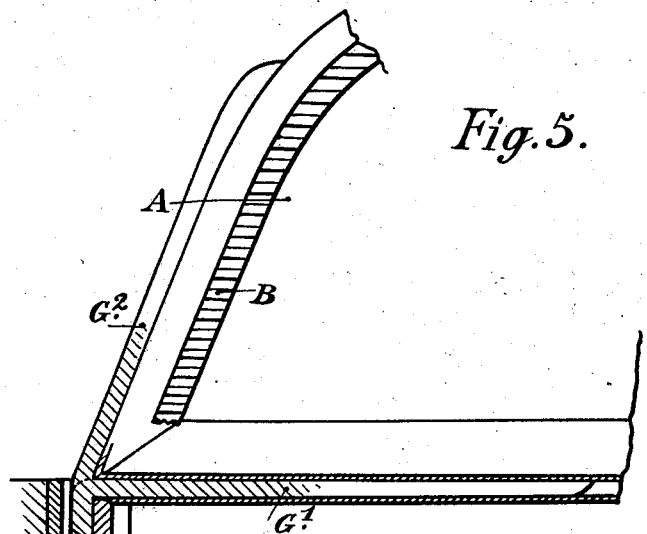
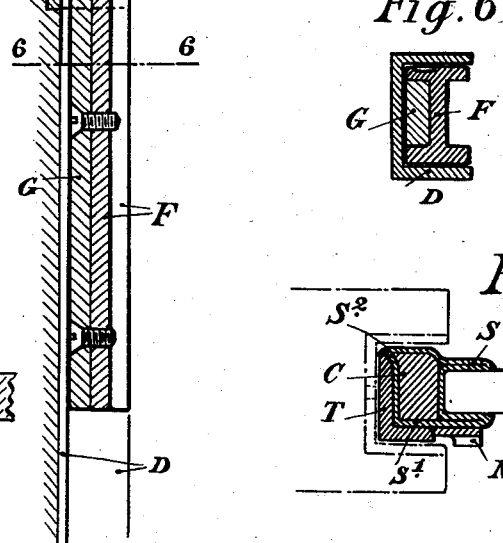
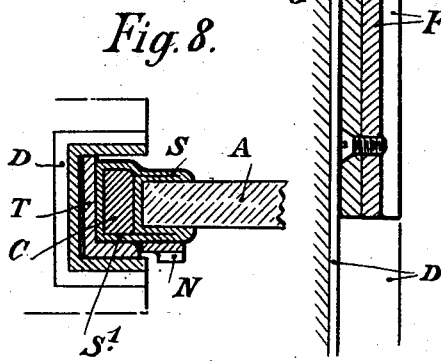
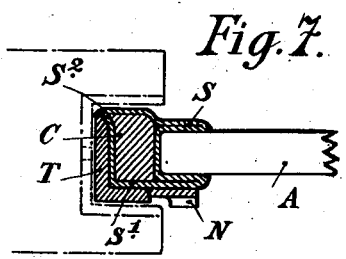
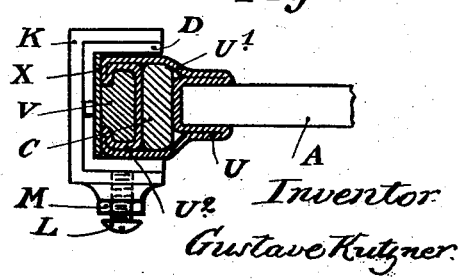
Inventor
Gustave Kutzner.
by Connolly Bros.
Attys Patented May 6, 1930

1,757,639

UNITED STATES PATENT OFFICE

GUSTAVE KUTZNER, OF COURBEVOIE, FRANCE

SLIDING WINDOW FOR VEHICLES

Application filed July 3, 1928, Serial No. 290,195, and in France December 23, 1927.

This invention relates to vertically sliding windows for rail and road vehicles, more particularly for automobile doors. It comprises also a window operating mechanism and a locking device for fixing it in any position.

An object of the invention is to provide a window sash of great stiffness the construction of which is more economical than heretofore.

Another object of the invention is to improve the sliding brackets supporting the window.

A further object of the invention is to provide means for raising and lowering the window.

A still further object is to provide a locking device for fixing the window in any position.

The invention also consists in certain other features of construction, to be hereinafter fully described, illustrated in the drawings and specifically pointed out in the appended claims.

In describing the invention in detail, reference will be had to the accompanying drawings wherein like characters denote like parts throughout the several views, in which:

Figure 1 is a longitudinal section through a vehicle door or body and the window thereof, taken on line 1—1 of Fig. 2.

Figure 2 is a horizontal section on line 2—2 of Fig. 1, showing one guiding bracket of the window in its slide.

Figure 3 is a fragmentary horizontal section of the window, on line 3—3 of Fig. 1.

Figure 4 is a fragmentary end view, corresponding to Fig. 2, showing the device for enabling the window to slide smoothly in its slide or frame.

Figure 5 is a view similar to Fig. 1, showing a first modification of the guiding bracket.

Figure 6 is a horizontal section, on line 6—6 of Fig. 5.

Figures 7, 8 and 9, are horizontal sections showing other forms of construction of the window sash.

Referring particularly to Figs. 1 to 4, which illustrate a first embodiment of the invention, A denotes the glass pane proper, the lateral edges of which are assumed to be vertical. According to the invention, the sash of the window is, as shown in Fig. 3, constituted by a plurality of tubular elements, connected together, each element being so shaped as to provide a channel, S, for the glass pane, and a cage $S^1$, for the vertical, flat, iron C, fixed to the window sash. The tubular elements may be made by suitably bending ordinary seamless tubes. This flat iron is slightly deflected outside its lodgement in the sash and its lower end is set between the forward flanges of a vertical I iron, F, placed at the underside of the window and adapted to constitute one of the two sliding brackets of said window. In the other pair of the I iron flanges is set the vertical branch, G, of an angle iron the horizontal branch of which $G^1$, is fixed to the underside of the horizontal lower part of the window sash in the tubular recess thereof. These three irons, C, F and G—$G^1$ are tightly held together by any means, for instance by means of screws, thus constituting a bracket for supporting the window and guiding it in the door slot. Owing to the particular connection of the vertical flat iron C with the angle iron G—$G^1$ through the medium of the I iron, F, the whole of the construction is endowed with a great stiffness.

The device for guiding the window in the slide D may be completed by thin strips of felt or rubberized velvet H, H (Fig. 2). In accordance with the invention, the play of the sliding bracket C—F—G—$G^1$ in the vertical slide D, is adjusted in the following manner: The upper end of the U or channel iron D, is slit on a certain length (Figs. 1, 2, 4); this part of the channel iron is lodged in a casing K, set in the door pane, and in which works a set screw L, provided with a lock-nut M, the end of the said screw bearing upon one of the flanges of the channel iron D. By more or less screwing or unscrewing the screw L, the two flanges of the channel iron are caused to move more or less towards each other pressing more or less tightly the flanges of the I iron, F.

The window operating mechanism is constituted by a toothed rack cut on or fixed to the window sash (Fig. 3), which rack meshes in a known manner with a spur pinion, keyed on a shaft O, the ends of which rotate in the fixed part of the door, and on which is fast a high pitched globoid worm P meshing with a worm wheel Q. This latter is fast on a shaft $q$, at right angles to the plane of Fig. 1, and provided with the usual handle R—R¹. The rotation of said handle in one direction or the other, causes the rotation of the wheel Q, worm P, shaft O and, consequently, of the spur pinion fixed on this shaft. In its turn, this pinion, meshing with the toothed rack N, raises or lowers this latter and with it the window A.

The modification shown in Figs. 5 and 6 relates only to the guiding bracket supporting the window; the slide or slot provided in the door remaining identical to that shown in Fig. 1. This modification is applied to a trapezoidal window, but it is to be understood that it is applicable to a rectangular one.

In this modification, the I iron, F, has been retained, but the flat iron C and the angle iron G—G¹ have been combined in one three arm support G—G¹—G² of which the upper arm G², attached to the lateral portion of the window sash, takes the place of the flat iron C in the first constructional form. The lower vertical arm G, instead of being set between the rearwardly situated flanges of the I iron (on the right hand, in the drawing), is set in the opposite pair of flanges, taking the place of the flat iron C in the first form of construction. This arm G and the web of the I iron F, are, as in the first case, fixed together, for instance by means of screws.

The second modification shown in Fig. 7 differs from that shown in Fig. 3, only by the addition, to the tubular sash S—S¹ of the window, of a guiding and stiffening angle iron, T, a flange of which is adjacent to the rack N, the other flange abutting against a projection provided in the tubular window sash. Of course, said angle iron is provided only upon the lateral parts of the sash; the guiding brackets of the window remaining the same as in Figs. 1, 2 and 4.

The modification shown in Fig. 8 differs from that shown in Fig. 7 only by the projection S² of the sash S—S¹ being taken off. In this case, the height of the transverse flange of the angle iron is such as to be capable of sliding in the channel iron D.

Finally, the modification shown in Fig. 9 is particularly designed for the case where the lifting movement of the window is, in the known manner, stopped by a spur which bears upon a telescopic arm. As shown in Fig. 9, and referring to Figs. 7 and 8, it is seen how to constitute from a seamless tube: (1) a channel, U, for the edge of the glass pane; (2) a tubular cage, U¹, for the flat iron C; (3) a slide, U², for the telescopic arm V. The flanges of this open slide bear against the spur X which itself bears against the web of the channel iron D.

What I claim and desire to secure by Letters Patent of the United States of America is:

1. A vertically sliding window for vehicles, comprising a sash for a glass pane, constituted by a number of tubular elements joined together, each element being made by bending or drawing a seamless tube so as to obtain a channel between the flanges and against the bottom of which is set one edge of the glass pane, a tubular recess, the two lateral elements of the sash each receiving a flat iron, fitted in the tubular recess, and adapted to stiffen the sash and to connect it rigidly with a bracket having a vertical and horizontal arm for supporting the window and guiding it in the slide of the vehicle body or door said bracket having its horizontal arm fitting in the tubular recess of the bottom element of the sash.

2. A vertically sliding window for vehicles, comprising a sash for a glass pane, constituted by a number of tubular elements joined together, each element being made by bending or drawing a seamless tube so as to obtain a channel between the flanges and against the bottom of which is set one edge of the glass pane, a tubular recess, the two lateral elements of the sash each receiving a flat iron fitted in the tubular recess, which flat iron from the point where it leaves the bottom of the sash, is fitted between the one pair of the flanges of a vertical I iron the other pair of which receive the vertical arm of an angle iron the horizontal arm of which is fitted into the tubular recess of the lower horizontal element of the sash, these three parts: flat iron, I iron, and vertical arm of the angle iron being tightly held together, constitute one of the two supporting brackets of the window, which bracket is guided in a vertical slot or slide of the vehicle body or door, through the flanges of the I iron.

3. A vertically sliding window for vehicles, comprising a sash for a glass pane, constituted by a number of tubular elements joined together, each element being made by bending or drawing a seamless tube so as to obtain a channel between the flanges and against the bottom of which is set one edge of the glass pane, a tubular recess, the two lateral elements of the sash each receiving a flat iron fitted in the tubular recess, which flat iron, from the point where it leaves the bottom of the sash, is fitted between the one pair of flanges of a vertical I iron and is formed with a horizontal arm fitted into the tubular recess of the lower horizontal element of the sash, thus constituting a three arm support, the lower vertical arm of which is connected to the I iron guiding the bracket in the corresponding slide of the vehicle body or door.

In witness whereof I affix my signature.

GUSTAVE KUTZNER.